United States Patent
Stephens

(10) Patent No.: US 9,723,371 B2
(45) Date of Patent: *Aug. 1, 2017

(54) SYSTEMS AND METHOD FOR TIMING COMMERCIAL BREAKS

(71) Applicant: Echostar UK Holdings Limited, Keighley (GB)

(72) Inventor: Matthew Stephens, North Yorkshire (GB)

(73) Assignee: Echostar UK Holdings Limited, Keighley (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/131,910

(22) Filed: Apr. 18, 2016

(65) Prior Publication Data

US 2016/0234565 A1 Aug. 11, 2016

Related U.S. Application Data

(63) Continuation of application No. 14/275,080, filed on May 12, 2014, now Pat. No. 9,344,665.

(51) Int. Cl.
*H04N 5/445* (2011.01)
*H04N 21/262* (2011.01)
(Continued)

(52) U.S. Cl.
CPC .......... *H04N 21/812* (2013.01); *H04N 5/445* (2013.01); *H04N 5/44582* (2013.01); *H04N 21/2353* (2013.01); *H04N 21/23424* (2013.01); *H04N 21/262* (2013.01); *H04N 21/435* (2013.01); *H04N 21/4316* (2013.01); *H04N 21/4383* (2013.01); *H04N 21/44004* (2013.01); *H04N 21/44008* (2013.01); *H04N 21/44016* (2013.01); *H04N 21/4424* (2013.01); *H04N 21/4532* (2013.01); *H04N 21/4622* (2013.01); *H04N 21/472* (2013.01); *H04N 21/4755* (2013.01); *H04N 21/4882* (2013.01); *H04N 21/8133* (2013.01); *H04N 21/84* (2013.01)

(58) Field of Classification Search
CPC .......... H04N 21/23424; H04N 21/812; H04N 21/2353; H04N 21/262; H04N 21/4316; H04N 21/4383; H04N 21/44016; H04N 21/4424; H04N 21/4532; H04N 21/4622; H04N 21/472; H04N 21/4755; H04N 21/4882; H04N 21/84; H04N 5/445
USPC .......................................... 725/82, 84, 32, 34
See application file for complete search history.

(56) References Cited

U.S. PATENT DOCUMENTS

| | | | | |
|---|---|---|---|---|
| 4,918,531 A | * | 4/1990 | Johnson | ............... H03J 1/0008 348/565 |
| 2002/0194592 A1 | * | 12/2002 | Tsuchida | ............... H04H 20/10 725/32 |

(Continued)

FOREIGN PATENT DOCUMENTS

EP  0366001 B1 * 8/1994 ............ H03J 1/0008

*Primary Examiner* — Nathan Flynn
*Assistant Examiner* — Caroline Somera
(74) *Attorney, Agent, or Firm* — Kilpatrick Townsend & Stockton LLP

(57) ABSTRACT

Various arrangements are presented for handling broadcast television commercials. A television receiver may receive, from a television service provider, metadata that indicates a commencement of a television commercial break and an expected duration. Based on the metadata, the television receiver may initiate a countdown timer such that the countdown timer is based on the expected duration of the television commercial break and counts down.

14 Claims, 10 Drawing Sheets

(51) Int. Cl.
*H04N 21/435* (2011.01)
*H04N 21/472* (2011.01)
*H04N 21/84* (2011.01)
*H04N 21/81* (2011.01)
*H04N 21/442* (2011.01)
*H04N 21/235* (2011.01)
*H04N 21/44* (2011.01)
*H04N 21/462* (2011.01)
*H04N 21/431* (2011.01)
*H04N 21/438* (2011.01)
*H04N 21/45* (2011.01)
*H04N 21/475* (2011.01)
*H04N 21/488* (2011.01)
*H04N 21/234* (2011.01)

(56) References Cited

U.S. PATENT DOCUMENTS

| | | | | |
|---|---|---|---|---|
| 2002/0194595 | A1* | 12/2002 | Miller | H04H 20/10 725/36 |
| 2003/0115595 | A1* | 6/2003 | Stevens | H04N 7/163 725/32 |
| 2006/0238656 | A1* | 10/2006 | Chen | H04N 5/50 348/731 |
| 2007/0055983 | A1* | 3/2007 | Schiller | H04N 21/23424 725/32 |
| 2008/0134043 | A1* | 6/2008 | Georgis | G06F 17/30035 715/733 |
| 2008/0216124 | A1* | 9/2008 | Dekkers | H04N 5/45 725/59 |
| 2008/0297669 | A1* | 12/2008 | Zalewski | H04N 7/163 348/844 |
| 2012/0185898 | A1* | 7/2012 | Kamen | G06Q 30/02 725/34 |
| 2013/0014171 | A1* | 1/2013 | Sansom | G06F 17/3082 725/52 |
| 2014/0068662 | A1* | 3/2014 | Kumar | H04N 21/23424 725/34 |
| 2014/0115631 | A1* | 4/2014 | Mak | H04N 21/23424 725/42 |
| 2015/0040176 | A1* | 2/2015 | Hybertson | H04N 21/4383 725/131 |

\* cited by examiner

SYSTEMS AND METHOD FOR TIMING COMMERCIAL BREAKS

CROSS-REFERENCES TO RELATED APPLICATIONS

This application is a continuation of U.S. patent application Ser. No. 14/275,080, filed May 12, 2014, entitled "SYSTEMS AND METHOD FOR TIMING COMMERCIAL BREAKS," the entire disclosure of which is hereby incorporated by reference for all purposes.

BACKGROUND

When a television viewer is watching broadcast television programming, commercial breaks are a common occurrence. During a commercial break, when one or more commercials are being broadcast, television viewers will frequently: leave the room, change the television channel, do a brief chore, and/or get a snack. These actions may often be performed with the intent of returning to viewing the television channel when the commercial break ends. The television viewer may become frustrated when the television viewer loses track of time and returns to the television channel after the commercial break has ended or returns to the television channel broadcasting the commercial break too soon and is subjected to viewing a portion of the commercial break.

SUMMARY

In some embodiments, a method for handling broadcast television commercials is presented. The method may include receiving, by a television receiver, metadata that indicates a commencement of a television commercial break and an expected duration. The method may include, based on the metadata, initiating, by the television receiver, a countdown timer such that the countdown timer is based on the expected duration of the television commercial break and counts down. The method may include outputting, by the television receiver, for presentation, a remaining duration based on the countdown timer as the countdown timer counts down.

Embodiments of such a method may include one or more of the following features: Outputting for presentation the remaining duration may occur via a display present on the television receiver. The method may include outputting, by the television receiver, to a presentation device, a first broadcast of a first television channel. The first television channel may be presenting the television commercial break. The method may include outputting the remaining duration comprises presenting the remaining duration on the presentation device overlaid on the television commercial break. The method may include outputting, by the television receiver, a second broadcast of a second television channel in response to user input. The method may include continuing to output, by the television receiver, the remaining duration overlaid on the second broadcast of the second television channel. The method may include changing, by the television receiver, the second television channel to the first television channel based on the remaining duration expiring. The method may include receiving, by the television receiver, a user-defined time period, wherein the remaining duration is output for presentation in response to the remaining duration equaling or being less than the user-defined time period. The method may include receiving, by the television receiver, a command from a remote control requesting the remaining duration, wherein the remaining duration is output for presentation in response to the command. The method may include, in response to the metadata, accessing, by the television receiver, a streaming content provider. The method may include, based upon the remaining duration, requesting, by the television receiver, from the streaming content provider, a piece of content equal to or less than the remaining duration. The method may include receiving, by the television receiver, the piece of content. The method may include outputting, by the television receiver, the piece of content during the remaining duration. The method may include presenting the piece of content in lieu of at least a portion of the television commercial break. The metadata may be received from a third-party provider via a network connection, the third-party provider being distinct from a television service provider. The method may include presenting the piece of content simultaneously with at least a portion of the television commercial break.

In some embodiments, a system for handling broadcast television commercials is presented. The system may include one or more processors. The system may further include a memory communicatively coupled with and readable by the one or more processors and having stored therein processor-readable instructions. When executed by the one or more processors, the instructions may cause the one or more processors to receive metadata that indicates a commencement of a television commercial break and an expected duration. The instructions may cause the one or more processors to, based on the metadata, initiate a countdown timer such that the countdown timer is based on the expected duration of the television commercial break and counts down. The instructions may cause the one or more processors to output for presentation, a remaining duration based on the countdown timer as the countdown timer counts down.

In various embodiments such a system, one or more of the following features may be present: The processor-readable instructions that, when executed, cause the one or more processors to output for presentation the remaining duration may occur via a display present on the television receiver. The instructions may cause the one or more processors to output, to a presentation device, a first broadcast of a first television channel. The first television channel may be presenting the television commercial break. The instructions may cause the one or more processors to outputting the remaining duration comprises presenting the remaining duration on the presentation device overlaid on the television commercial break. The instructions may cause the one or more processors to output a second broadcast of a second television channel in response to user input. The instructions may cause the one or more processors to continue to output the remaining duration overlaid on the second broadcast of the second television channel. The instructions may cause the one or more processors to receive a command from a remote control requesting the remaining duration, wherein the remaining duration is output for presentation in response to the command, wherein the system further comprises the remote control. The instructions may cause the one or more processors to, in response to the metadata, access a streaming content provider. The instructions may cause the one or more processors to, based upon the remaining duration, request, from the streaming content provider, a piece of content equal to or less than the remaining duration. The instructions may cause the one or more processors to receive the piece of content. The instructions may cause the one or more processors to output the piece of content during the remaining duration. The instructions may cause the one or more processors to cause the piece of content to be output for presentation in lieu of at least a portion of the television commercial break. The system may be configured to receive the metadata from a third-party provider via the Internet, the third-party provider being distinct from a television service provider.

In some embodiments, a non-transitory processor-readable medium for handling broadcast television commercials is presented. The medium may include processor-readable instructions configured to cause one or more processors to receive metadata that indicates a commencement of a television commercial break and an expected duration. The instructions may be configured to cause the one or more processors to, based on the metadata, initiate a countdown timer such that the countdown timer is based on the expected duration of the television commercial break and counts down. The instructions may be configured to cause the one or more processors to output for presentation a remaining duration based on the countdown timer as the countdown timer counts down.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A countdown timer may permit a user to accurately time how long remains until a commercial break is expected to end and the television program that the user desires to view is expected to resume being broadcast. A television service provider may broadcast metadata that provides information to a television receiver (e.g., a set top box) that indicates when a television commercial break commences and the expected duration. The expected duration may be based on a historical analysis of commercial breaks on the television channel or on television channels generally. Based on the metadata, a countdown timer may be initiated by the television receiver and output for presentation, either via a presentation device (e.g., a television) or directly via a display of the television receiver (e.g., on the face of the television receiver). Upon the countdown timer expiring, if another television channel has been selected for output, the television receiver may resume outputting the television channel on which the commercial break occurred. In some embodiments, as the remaining duration of the countdown timer elapses and reaches a reference value, a picture-in-picture (PiP) view of the channel on which the commercial break was reached may be presented if the television channel has been changed. A user may then provide user input if the user desires to return to the television channel on which the commercial break was broadcast.

In some embodiments, content from a second source, rather than another television channel, may be presented during a commercial break. A user may define preferences about the types of content the user desires to view. When the countdown timer is initiated at the television receiver, content from another source, such as an Internet-based content streaming service, may be output for presentation while the countdown timer is elapsing. Such content may be retrieved via an Internet connection, in contrast to the television channel which may be received via a television service provider's network. When the countdown timer finishes elapsing, the television channel may resume being output for presentation.

Figure 1:
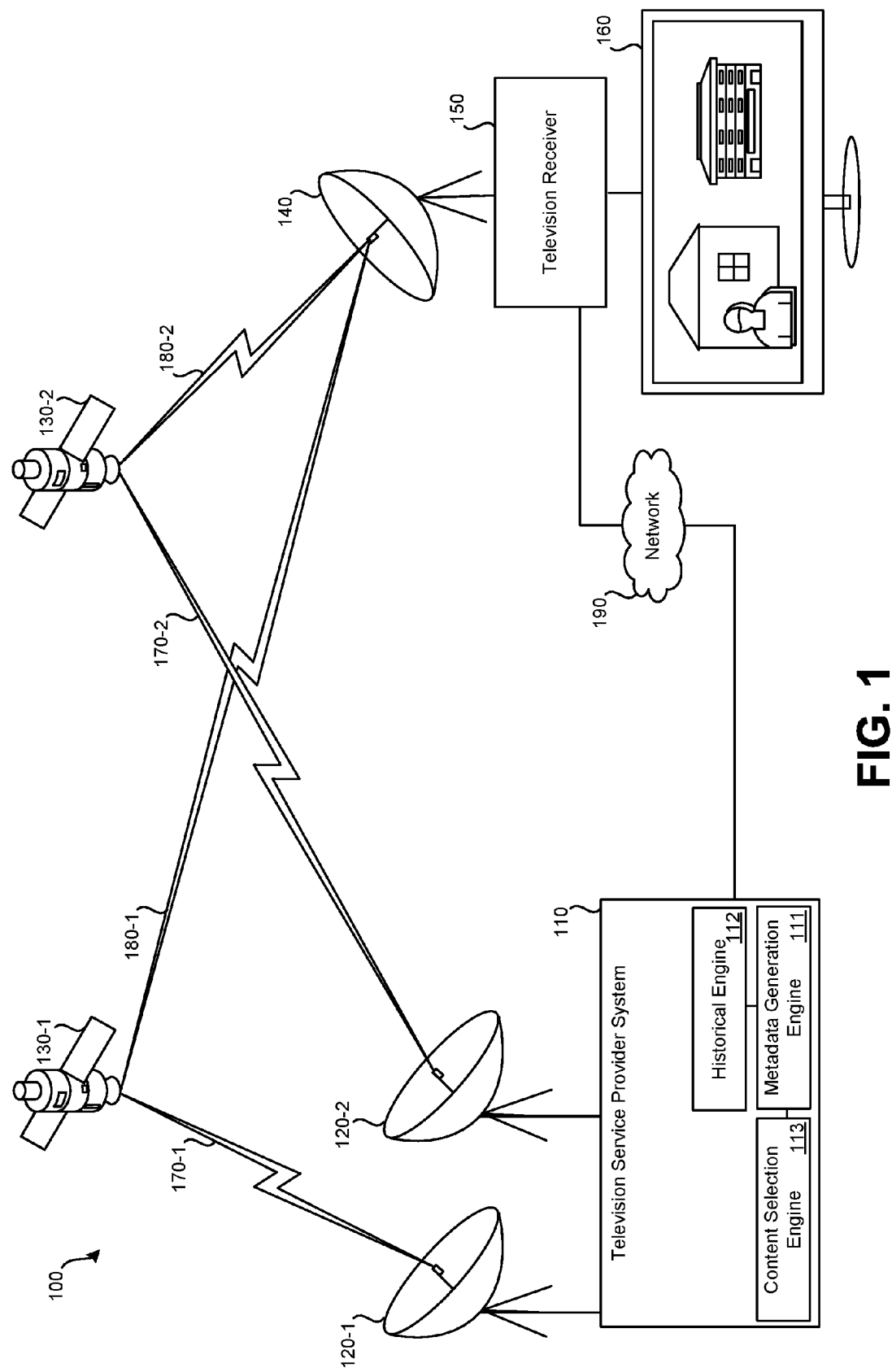
FIG. 1 illustrates an embodiment of a satellite television distribution system.

FIG. 1 illustrates an embodiment of a satellite television distribution system 100 configured to manage encoding and distribution of content. Satellite television distribution system 100 may include: television service provider system 110, satellite transmitter equipment 120, satellites 130, satellite dish 140, television receiver 150, and presentation device 160. Alternate embodiments of satellite television distribution system 100 may include fewer or greater numbers of components. While only one satellite dish 140, television receiver 150, and presentation device 160 are illustrated, it should be understood that multiple (e.g., tens, thousands, millions) instances of user equipment may receive television signals from television service provider system 110 via satellites 130. While FIG. 1 focuses on satellite-based distribution of television broadcasts, it should be understood that embodiments detailed in relation to FIGS. 2-9 can be implemented in other forms of television distribution systems that distribute television programming, such as cable-based distribution systems, over-the-air (OTA) distribution systems, and IP-based distribution systems, to name several examples.

Television service provider system 110 and satellite transmitter equipment 120 may be operated by a television service provider. A television service provider may distribute television channels, on-demand programming, programming information, and/or other content/services to users. Television service provider system 110 may receive feeds of one or more television channels from various sources. To distribute television channels for presentation to users, feeds of the television channels may be relayed to user equipment via multiple television distribution satellites. Each satellite may relay multiple transponder streams. Satellite transmitter equipment 120 (120-1, 120-2) may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Such streams may be encoded to save bandwidth. For example, MPEG encoding may be used to decrease the amount of bandwidth required to broadcast content. Satellites 130 may relay received signals from satellite transmitter equipment 120 (and/or other satellite transmitter equipment) to multiple instances of user equipment via transponder streams. Different frequencies may be used for uplink signals 170 from transponder streams 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed.

Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 130-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Each of these television channels may be encoded. Accordingly, if many television channels are to be made available for viewing and recording, multiple transponder streams may be necessary to transmit all of the television channels to television receiver 150. In addition to carrying television channels, a transponder stream may include metadata. Metadata may include data that is not audio or video data to be output for presentation via a presentation device. Rather, metadata may be used to control operation and/or configuration of a television receiver.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies.

Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

In communication with satellite dish 140 may be one or more television receivers. Television receivers may be configured to decode signals received from satellites 130 via satellite dish 140 for output and presentation via a presentation device, such as presentation device 160. A television receiver may be incorporated as part of a television or may be part of a separate device, commonly referred to as a set-top box (STB). Television receiver 150 may decode signals received via satellite dish 140 and provide an output to presentation device 160. A television receiver is defined to include STBs and also circuitry having similar functionality that may be incorporated with another device. For instance, circuitry similar to that of a television receiver may be incorporated as part of a television. As such, while FIG. 1 illustrates an embodiment of television receiver 150 as separate from presentation device 160, it should be understood that, in other embodiments, similar functions may be performed by a television receiver integrated with presentation device 160. The television receivers detailed herein can be considered a form of DVR because such television receivers may have DVR functionality. Accordingly, embodiments detailed herein that explicitly refer to a DVR or device with DVR functionality can refer to a television receiver, which may be in the form of an STB.

Presentation device 160 may be used to present video and/or audio decoded and output by television receiver 150. Television receiver 150 may also output a display of one or more interfaces to presentation device 160, such as an electronic programming guide (EPG) and/or an interface to permit the selection of streaming content for during commercial breaks. In many embodiments, presentation device 160 is a television. Presentation device 160 may also be a monitor, computer, or some other device configured to display video and, possibly, play audio.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a first group of television channels, while uplink signal 170-2 contains a second group of television channels. Each of these television channels may be scrambled such that unauthorized persons are prevented from accessing the television channels.

Transponder stream 180-1 represents a transponder stream signal between satellite 130-1 and satellite dish 140. Transponder stream 180-2 represents a transponder stream signal between satellite 130-2 and satellite dish 140. Each of transponder streams 180 may contain one or more different television channels, which may be at least partially scrambled. For example, transponder stream 180-1 may be a first transponder stream containing a first group of television channels, while transponder stream 180-2 may be a second transponder stream containing a different group of television channels.

FIG. 1 illustrates transponder stream 180-1 and transponder stream 180-2 being received by satellite dish 140 and distributed to television receiver 150. For a first group of television channels, satellite dish 140 may receive transponder stream 180-1 and for a second group of channels, transponder stream 180-2 may be received. Television receiver 150 may decode the received transponder streams via two tuners. As such, depending on which television channels are desired to be presented or stored, various transponder streams from various satellites may be received, descrambled, and decoded by television receiver 150.

Network 190 may serve as a secondary communication channel between television service provider system 110 and television receiver 150. Via such a secondary communication channel, bidirectional exchange of data may occur. As such, data may be transmitted to television service provider system 110 from television receiver 150 via network 190. Data may also be transmitted from television service provider system 110 to television receiver 150 via network 190. Network 190 may be the Internet. In addition to communication with television service provider system 110 via network 190, television receiver 150 may access other services via network 190. For example, television receiver 150 may be able to access a third-party streaming content service provider, such as YouTube®, Vimeo®, Hulu®, Amazon®, or some other streaming content service provider. Content from such streaming content service providers may be streamed to presentation device 160 via television receiver 150. Television receiver 150 may be configured to select and request specific pieces of content from among the content available at one or more streaming content service providers.

Television service provider system 110 may include one or more components that enable the distribution of metadata that indicates the beginning, end, and/or (expected) duration of commercial breaks and/or individual commercials. Metadata generation engine (MGE) 111 may serve to create metadata that is inserted into a transponder stream. MGE 111 may create metadata to be inserted into a transponder stream that corresponds to the television channels that are carried on that specific transponder stream. MGE 111 may create metadata that indicates when a commercial break commences. Therefore, the location of the metadata in the transponder stream may indicate that data for a specific television channel received after the metadata likely corresponds to a television commercial break. In some embodiments, the metadata includes an indication of when the commercial break is expected to begin (such as in ten seconds). MGE 111 may insert metadata based on an agent of the television service provider indicating to MGE 111 that a commercial break has commenced (such as by viewing the broadcast content that includes the television program and commercials). In some embodiments, commercial breaks are detected automatically by MGE 111. The stream of a television channel received by television service provider system 110 may include indications of the commencement of commercial breaks and/or specific commercials. In some embodiments MGE 111 may monitor an earlier broadcast instance of a television program to determine locations and/or durations of commercial breaks that will likely appear during later broadcast of an instance of the television program. For instance, in parts of Europe it may be commonplace that a separate television channel is a delayed version of another television channel (e.g., same programming schedule, but delayed an hour).

Metadata generation engine (MGE) 111 (and/or other components) may be operated by a third-party provider rather than the television service provider. For instance, metadata may be provided by a third-party provider via network 190 to television receiver 150. For instance, a user may pay a fee to the third-party provider in order to receive metadata from the third-party provider.

In addition to indicating the beginning of a commercial break, metadata provided to television receivers from MGE 111 may include an indication of the actual or expected duration of a commercial break (or specific commercials within the commercial break). The duration may be a default value, such as three minutes. In some embodiments, the duration may be based upon historical engine 112, which may analyze previous commercial breaks on the same television channel (or multiple television channels). For example, if a television program airs weekly, the commercial break duration may generally remain constant from week to week. As such, commercial breaks from earlier episodes or airings of the same television program may accurately serve to predict future commercial breaks. Predictions based upon such a historical analysis may be determined by historical engine 112. In some embodiments, a particular television channel may be a delayed version of another television channel, which may be being broadcast in the same or a different time zone. The duration and location of commercial breaks within a television program on the television channel broadcast first may accurately be used to predict the broadcast of television commercial breaks on the later-broadcast version of the television channel.

In embodiments where streaming content is presented via presentation device 160, content selection engine 113 may be used to select specific instances of content for presentation from one or more streaming content service providers. The content selected may at least partially be based on the expected duration of the commercial break. For example, if the commercial break is expected to last three minutes, the content selected for during the commercial break may, in total, be equal to or less than three minutes. MGE 111 may encode indications of content from content selection engine 113 to be transmitted to television receiver 150 as part of the transponder stream. Television receiver 150 could then retrieve the content via network 190 from the indicated streaming content service provider. In some embodiments, rather than historical engine 112 and/or content selection engine 113 being part of television service provider system 110, similar components may be part of television receiver 150.

Figure 2:
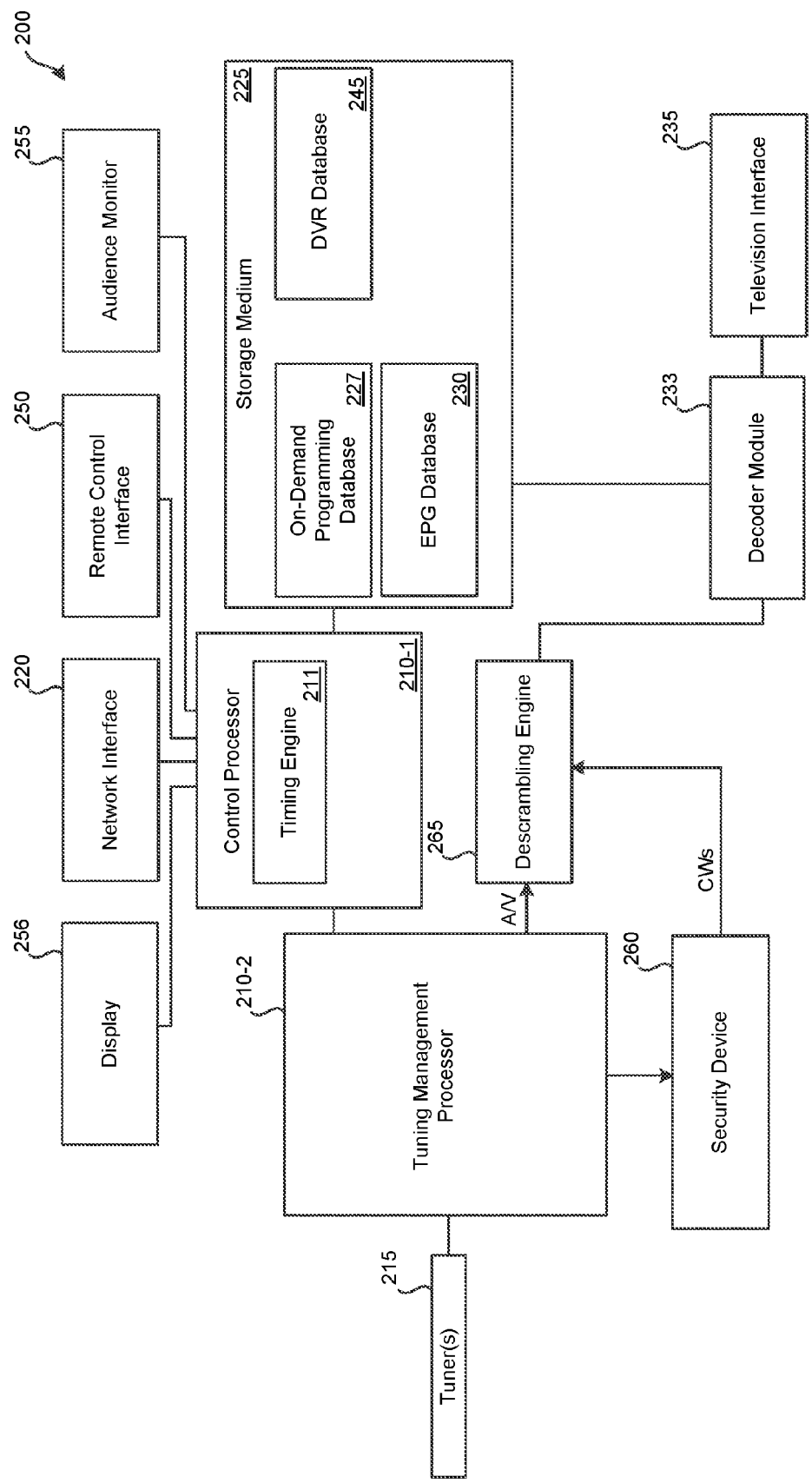
FIG. 2 illustrates an embodiment of a television receiver.

FIG. 2 illustrates an embodiment of a television receiver 200. Television receiver 200 may represent television receiver 150 of FIG. 1. Television receiver 200 may be in the form of a separate device configured to be connected with a presentation device, such as a television. Embodiments of television receiver 200 can include set top boxes (STBs). In addition to being in the form of an STB, a television receiver may be incorporated as part of another device, such as a television, other form of presentation device, video game console, computer, mobile phone or tablet or the like. For example, a television may have an integrated television receiver (which does not involve an external STB being coupled with the television).

Television receiver 200 may include: processors 210 (which may include control processor 210-1, tuning management processor 210-2, and possibly additional processors), tuners 215, network interface 220, non-transitory computer-readable storage medium 225, electronic programming guide (EPG) database 230, television interface 235, digital video recorder (DVR) database 245 (which may include provider-managed television programming storage and/or user-defined television programming), on-demand programming database 227, remote control interface 250, security device 260, descrambling engine 265, decoder module 233, audience monitor 255, and/or display 256. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components.

Processors 210 may include one or more specialized and/or general-purpose processors configured to perform processes such as tuning to a particular channel, accessing and displaying EPG information from EPG database 230, and/or receiving and processing input from a user. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 245. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to decoder module 233 for output to a presentation device. Control processor 210-1 may also communicate with network interface 220 and remote control interface 250. Control processor 210-1 may handle incoming data from network interface 220 and remote control interface 250. Additionally, control processor 210-1 may be configured to output data via network interface 220.

Control processor 210-1 may include timing engine 211. Further detail regarding the functionality of timing engine 211 is provided in reference to timing engine 300 of FIG. 3.

Tuners 215 may include one or more tuners used to tune to transponders that include broadcasts of one or more television channels. In some embodiments, two, three, or more than three tuners may be present, such as four, six, or eight tuners. Each tuner contained in tuners 215 may be capable of receiving and processing a single transponder stream from a satellite transponder (or from a cable network) at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies are to be tuned to. In some embodiments, the key combination database (and/or remote control lock rules 247) are stored and processed by the remote control.

Network interface 220 may be used to communicate via an alternate communication channel with a television service provider, if such communication channel is available. The primary communication channel may be via satellite (which may be unidirectional to television receiver 200) and the alternate communication channel (which may be bidirectional) may be via a network, such as the Internet. Data may be transmitted from television receiver 200 to a television service provider system and from the television service provider system to television receiver 200. Information may be transmitted and/or received via network interface 220. For instance, instructions from a television service provider may also be received via network interface 220, if connected with the Internet. Network interface 220, if able to access the Internet, may be able to access one or more streaming content service providers. From such streaming content service providers, content for presentation in lieu of (or in addition to) commercial breaks may be retrieved by television receiver 200.

Storage medium 225 may represent one or more non-transitory computer-readable storage mediums. Storage medium 225 may include memory and/or a hard drive. Storage medium 225 may be used to store information received from one or more satellites, via a cable network, via some other form of television service provider network, and/or information received via network interface 220. Storage medium 225 may store information related to EPG database 230, DVR database 245, and/or on-demand programming 227. Recorded television programs may be stored using storage medium 225 as part of DVR database 245. Storage medium 225 may be partitioned or otherwise divided (such as into folders) such that predefined amounts of storage medium 225 are devoted to storage of television programs recorded due to user-defined timers and stored television programs recorded due to provider-defined timers.

EPG database 230 may store information related to television channels and the timing of programs appearing on such television channels. EPG database 230 may be stored using storage medium 225, which may be a hard drive or solid-state drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220, via satellite, or some other communication link with a television service provider (e.g., a cable network). Updates to EPG database 230 may be received periodically. EPG database 230 may serve as an interface for a user to control DVR functions of television receiver 200, and/or to enable viewing and/or recording of multiple television channels simultaneously. Information from EPG database 230 may be output as a video stream to a presentation device.

Decoder module 233 may serve to convert encoded video and audio into a format suitable for output to a presentation device. For instance, decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of presentation device and audio into a format appropriate to be output from speakers, respectively. Decoder module 233 may have the ability to convert a finite number of television channel streams received from storage medium 225 or descrambling engine 265, simultaneously. For instance, decoders within decoder module 233 may be able to only decode a single television channel at a time. Decoder module 233 may have various numbers of decoders.

Television interface 235 may serve to output a signal to a television (or another form of presentation device) in a proper format for display of video and playback of audio. As such, television interface 235 may output one or more television channels, and stored television programming from storage medium 225 (e.g., television programs from DVR database 245, television programs from on-demand programming 230 and/or information from EPG database 230) to a television for presentation.

Digital Video Recorder (DVR) functionality may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television channels. DVR database 245 may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record content from service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 200 via the television provider's network. For example, in a satellite-based television service provider system, data necessary to create the provider-defined timers at television receiver 200 may be received via satellite. Content from DVR database 245 may be output as a video stream to a presentation device.

As an example of DVR functionality of television receiver 200 being used to record based on provider-defined timers, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 225 for provider-managed television programming storage.

On-demand programming database 227 may store additional television programming. On-demand programming database 227 may include television programming that was not recorded to storage medium 225 via a timer (either user- or provider-defined). Rather, on-demand programming may be programming provided to the television receiver directly for storage by the television receiver and for later presentation to one or more users. On-demand programming may not be user-selected. As such, the television programming stored to on-demand programming database 227 may be the same for each television receiver of a television service provider.

Remote control interface 250 may receive communications from one or more remote controls (physically separate from television receiver 200) that allow a user to interact with television receiver 200. Remote control interface 250 may receive and send received commands to control processor 210-1, which may then process the commands.

Security device 260, which may be implemented as a smart card, may be used for decrypting incoming data. The decrypted data may be used by descrambling engine 265 for descrambling video and/or audio. Descrambled video and/or audio may be output by descrambling engine 265 to storage medium 225 for storage (in DVR database 245) and/or to decoder module 233 for output to a television or other presentation equipment via television interface 235.

Tuning management processor 210-2 may be in communication with tuners 215 and control processor 210-1. Tuning management processor 210-2 may be configured to receive commands from control processor 210-1. Such commands may indicate when to start/stop receiving and/or recording of a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data.

Television receiver 200 may include an audience monitor 255. Audience monitor 255 may include one or more image capture devices that are facing toward a region where one or more persons are likely to be located if watching content on a presentation device output by television receiver 200 via television interface 235. From the images captured by audience monitor 255, control processor 210-2 may be configured to determine if one or more persons are present. Whether one or more persons are present may cause commercial breaks to be handled differently.

Television receiver 200 may include display 256. Display 256 may be a display present directly on television receiver 200. Display 256 may be present in embodiments where television receiver 200 is in the form of an STB. Display 256 may allow television receiver 200 to directly display information (that is, without outputting the information to a presentation device for display). In some embodiments, display 256 is a monochrome display that can present numerals. For example, display 256 may be used to present a television channel number (e.g., the television channel number currently being output for presentation). Display 256 may also be used to output for presentation a remaining duration determined by timing engine 211.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components, such as disclosed in relation to computer system 900 of FIG. 9.

While the television receiver 200 has been illustrated as a satellite receiver, it is to be appreciated that techniques below may be implemented in other types of television receiving devices, such as cable receivers, terrestrial receivers, IPTV receivers or the like. In some embodiments, the television receiver 200 may be configured as a hybrid receiving device, capable of receiving content from disparate communication networks, such as satellite and terrestrial television broadcasts. In some embodiments, the tuners may be in the form of network interfaces capable of receiving content from designated network locations. Further, as previously detailed, the electronic device that interacts with the remote control may be some other type of device entirely.

Figure 3:
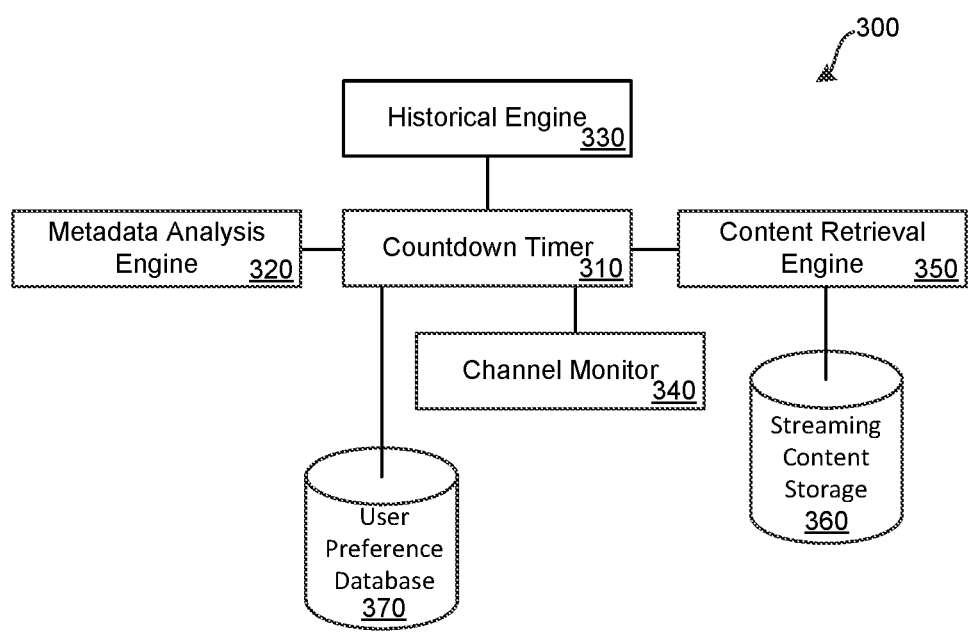
FIG. 3 illustrates an embodiment of a timing engine.

FIG. 3 illustrates an embodiment of a timing engine 300. Timing engine 300 may represent an embodiment of timing engine 211, which is at least partially implemented using control processor 210-1. Timing engine 300 may include: countdown timer 310, metadata analysis engine 320, historical engine 330, channel monitor 340, content retrieval engine 350, streaming content storage 360, and/or user preference database 370. While timing engine 211 is illustrated as part of control processor 210-one of television receiver 200, it should be understood that one or more components of timing engine 300 may be implemented using other components of television receiver 200; for instance, streaming content storage 360 may be implemented as storage on storage medium 225 of television receiver 200.

Countdown timer 310 may serve to countdown for a predetermined amount of time. For instance, if provided with an indication to start and a duration, such as 30 seconds, countdown timer 310 may start counting down from 30 seconds until 0 seconds is reached. While countdown timer 310 serves to indicate the amount of time remaining in a commercial break, countdown timer 310 may be implemented by a counter that counts up to a predetermined value associated with the expected duration of commercial break. While countdown timer 310 is executing, a remaining duration may be output by countdown timer 310 to television interface 235. Television interface 235, based on a user input or user preference, may be configured to overlay the remaining duration output by countdown timer 310 onto content being output to a presentation device by television interface 235.

Metadata analysis engine 320 may be configured to analyze metadata received from metadata generation engine 111 of television service provider system 110 of FIG. 1. Metadata analysis engine 320 may be configured to only analyze metadata associated with the television channel currently being output for presentation via television interface 235. Metadata analysis engine 320 may analyze received metadata to determine when a television commercial break is to begin and the expected duration of the commercial break. These two pieces of information may be passed to countdown timer 310, which may cause countdown timer 310 to commence a countdown. If the metadata received by metadata analysis engine 320 includes data related to content to be retrieved from a content streaming service for presentation during a commercial break, such information may be passed to content retrieval engine 350.

Historical engine 330 may function similarly to historical engine 112 of FIG. 1. However, rather than the functionality of historical engine 112 being implemented by a television service provider system 110, historical engine 330 may be implemented by control processor 210-1 of television receiver 200.

Channel monitor 340 may serve to monitor if a second television channel has been selected for output for presentation since a first commercial break has been commenced on a first television channel that was previously being output for presentation. If so, when the remaining duration of countdown timer 310 expires, channel monitor 340 may cause the first channel to again be output for presentation. In some embodiments, when the remaining duration of countdown timer 310 reaches a reference value, a picture-in-picture presentation of the first television channel may be presented overlaid on the second television channel. How the expiration of the remaining duration of countdown timer 310 is handled may be based at least in part on user preferences from user preference database 370 and on if another television channel has been selected for output while the countdown timer is active counting down.

Content retrieval engine 350 may be configured to retrieve content from a streaming content provider via network interface 220. Content retrieval engine 350 may temporarily store such content in streaming content storage 360. Such storage may permit buffering of content to occur while a television program is being output and have such content ready for presentation when a commercial break commences as indicated by received metadata. The content retrieved from one or more streaming content providers may be determined based on metadata indicating content selected by content selection engine 113 of television service provider system 110 and/or content selected by content retrieval engine 350 based on user preferences from user preference database 370. Regardless of which component selects the content, the content may be determined to be of a duration that is equal to or less than the remaining duration of countdown timer 310.

User preference database 370 may include preferences defined by a user of television receiver 200 that indicate how countdown timer 310 is to function. For instance, a user may indicate that on expiration of a countdown timer, the television receiver should tune to the first television channel on which the commercial break commenced (thus, returning to the first television channel if the user has changed to a second television channel during the commercial break). User preferences may indicate under what circumstances a remaining duration of countdown timer 310 are to be presented. For instance, the user may only desire the remaining duration to be presented if less than or equal to a reference value, defined by the user, is reached, such as thirty seconds; otherwise, the remaining duration may not be presented. The user may define under what circumstances a PiP of the first television channel is presented. For instance, a second reference value may be defined by the user, such as stating that a PiP of the television channel on which the commercial break was reached should be presented when the remaining duration reaches ten seconds. Such an arrangement may permit the user to see if the commercial break has ended early or will be ending late. The user may provide input via a remote control to indicate if the remaining duration should be displayed. The user may be required to provide input indicating that the first channel should be returned to. In some embodiments, the user may be required to provide input indicating that the first television channel is not to be returned to upon expiration of the countdown timer. Such variations may be defined by the user via user preference database 370.

Figure 4A:
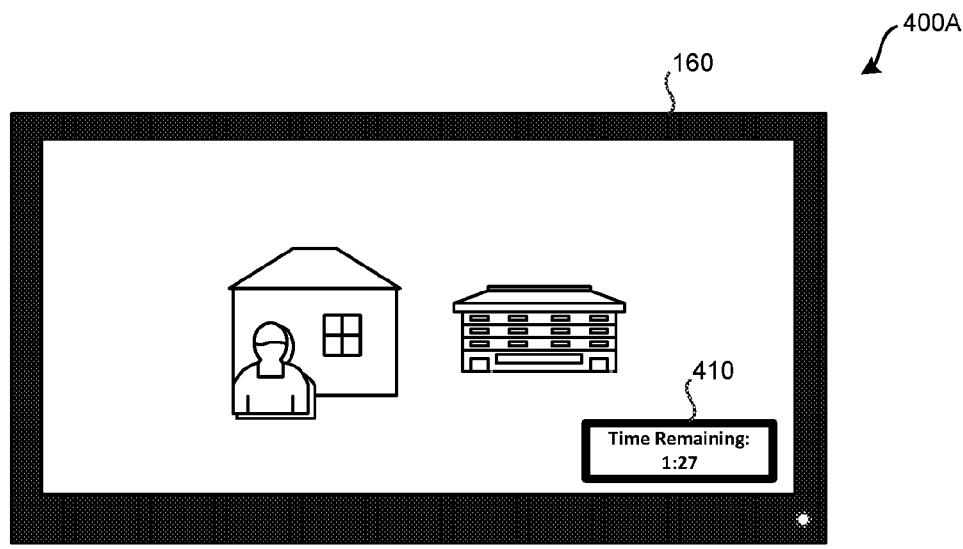
FIG. 4A illustrates an embodiment of presentation device receiving an output from the television receiver that includes a countdown timer.
Figure 4B:
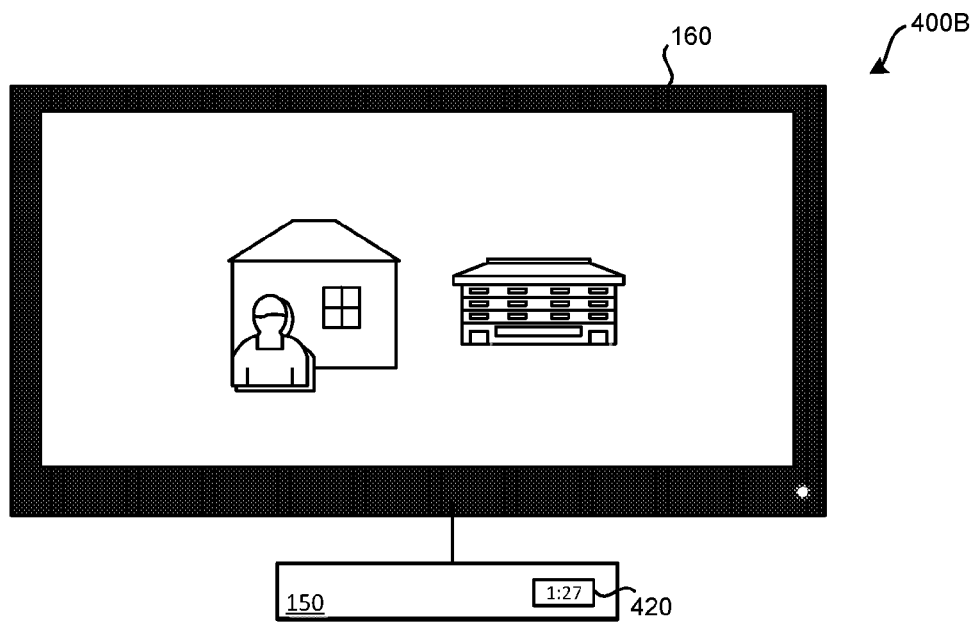
FIG. 4B illustrates an embodiment of a television receiver presenting a countdown timer.
Figure 4C:
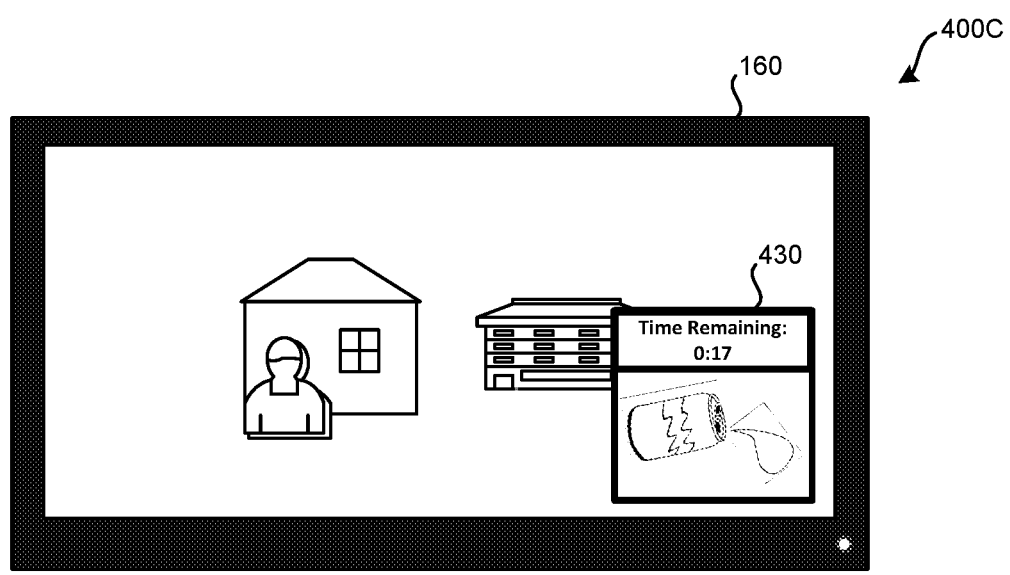
FIG. 4C illustrates an embodiment of a presentation device receiving an output from a television receiver that includes a countdown timer with a timer-induced picture-in-picture (PiP) display.
Figure 5:
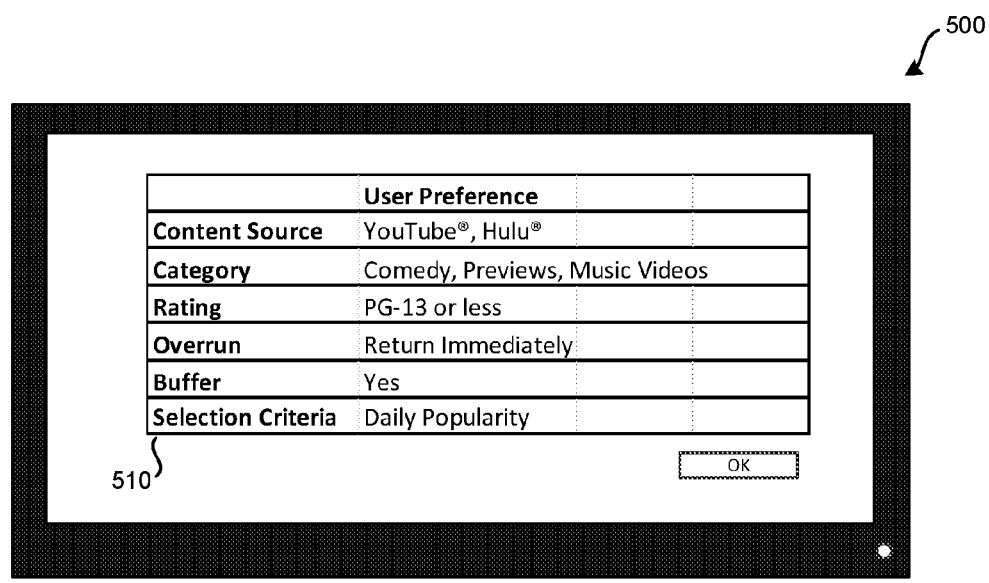
FIG. 5 illustrates an embodiment of a commercial-induced alternate content presentation selection interface.

FIGS. 4A-5 represents various embodiments of content, remaining durations and/or interfaces output for presentation by a television receiver, such as television receiver 200 of FIG. 2 which includes timing engine 300 of FIG. 3. It should be understood that the embodiments of these figures are intended to be exemplary. As such, other embodiments may be presented in a different format with more or less information.

FIG. 4A illustrates an embodiment 400A of presentation device receiving an output from the television receiver that includes a countdown timer. In embodiment 400A, a television channel is output for presentation by television receiver 200 to presentation device 160. The video and audio content output for presentation to presentation device 160 may correspond to a first television channel for which a commercial break has commenced or a second television channel which the user selected for presentation after the commercial break commenced. Regardless of whether the first television channel or the second television channel is being output for presentation by the television receiver, remaining duration 410 may be presented by presentation device 160 based on the output from television receiver 200. In some embodiments, remaining duration 410 may only be presented if the user has changed to the second television channel (that is, there may be no reason to present remaining duration 410 if the user has not changed the television channel).

Remaining duration 410 may be overlaid onto the video content output by television interface 235 of the television receiver. Remaining duration 410 may be opaque or partially transparent, which may allow for video content to be viewed "through" remaining duration 410. Remaining duration 410 may be based on the countdown being performed by countdown timer 310 of timing engine 300, which commenced in response to metadata analyzed by metadata analysis engine 320. In some embodiments, remaining duration 410 may not be presented until the predefined reference amount of time is reached by remaining duration 410. For example, remaining duration 410 may not be presented until less than a minute and a half is expected to be remaining in the commercial break.

FIG. 4B illustrates an embodiment 400B of a television receiver presenting a countdown timer. In embodiment 400B rather than remaining duration 410 being output for presentation via a presentation device 160, the remaining duration is output for presentation directly via a display of television receiver 150. Therefore, by a user looking directly at television receiver 150, remaining duration 420 may be viewed. By presenting remaining duration 420 directly on television receiver 150, the presentation of content via presentation device 160 may be presented without any overlay of information. Presentation of remaining duration 420 may occur via display 256 of television receiver 200 if television receiver 200 is in the form of an STB.

FIG. 4C illustrates an embodiment 400C of a presentation device receiving an output from a television receiver that includes a countdown timer with a timer-induced picture-in-picture (PiP) display. In such embodiments, if the user has tuned to a second television channel in response to a commercial break commencing on a first television channel, a PiP view of the first television channel may be output by television receiver 200. The PiP view 430 of the first television channel may commence once the remaining duration of the countdown timer reaches a predefined, reference value, such as thirty seconds remaining. The PiP view 430 may include the remaining duration. In some embodiments, the remaining duration may commence being presented in response to a different predefined, reference value, which may be greater in magnitude, such as one minute. PiP view 430 may be useful if the commercial break ends or runs over the expected duration, thus allowing the user to switch back to the first television channel earlier or later, such as depending on if the user sees a commercial or the desired television program being presented in PiP view 430. As illustrated in the embodiment of PiP view 430, a soda commercial is present on the first television channel. A user may press a remote control button to switch back to the first television channel. The second television channel may cease being presented or may switch to being presented in PiP view 430.

In some embodiments, content from a provider other than the television service provider is presented. Such content may be from a streaming content provider, which may be accessible via the Internet. FIG. 5 illustrates an embodiment 500 of a commercial-induced alternate content presentation selection interface. Interface 510 may permit a user to define various user preferences related to the selection of content for presentation in lieu of (or in addition to) a commercial break. User preferences defined via interface 510 may be stored by television receiver 200 as part of user preference database 370 (or, in some embodiments, may be transmitted to television service provider system 110 of FIG. 1). In interface 510, a user may be able to select from among a group of various available content sources. In some embodiments, the user is required to provide login credentials for one or more of the content sources. In other embodiments, login credentials may not be necessary, or credentials provided by the television service provider may be sufficient. Via interface 510, the user may be permitted to select from among various content categories from which the user desires to see content. In embodiment 500, the user has selected comedy, previews (e.g., movie previews, television program previews), and music videos. The categories available for selection may be defined by the various content sources or by the television service provider. Via interface 510, the user may be able to select a maximum rating. For example, the user may not desire to see R-rated material from a streaming content provider. In the illustrated embodiment, the user has selected the rating of PG-13 or less.

Via interface 510, the user may be able to select whether the content from the one or more streaming content providers is buffered by the television receiver prior to a commercial break commencing. Such buffering may permit the content to be presented sooner when a commercial break commences (because buffering would already have begun). Also, via interface 510, user may define one or more selection criteria. In the illustrated embodiment 500, the user has indicated that selection criteria should be based on the daily popularity of the content. Therefore, during a commercial break, the user may be presented one or more of the most popular pieces of content for that day present on the streaming content source that corresponds to the category and rating selected by the user. In some embodiments, the television service provider may provide indications of specific instances of content or categories of content that are to be retrieved by the television receiver from the one or more streaming content providers. As such, the television service provider may be able to define content that will be retrieved for presentation during a commercial break. Besides popularity, a user may be permitted to select among criteria such as: duration match (the duration of the content matches the duration of the countdown timer's remaining duration within a threshold amount of time), relativity (related to the television program or television channel which is on commercial break), or playlist (a preselected list of content determined by the user from which content is to be selected for playback).

Interface 510 may allow a user to define what occurs when the remaining duration has been overrun by content being output for presentation that was retrieved from a streaming content provider. In embodiment 500, the user has indicated that the television channel should resume being output for presentation, and the content from the streaming content provider should cease being presented (in some embodiments, it may resume during a future commercial break). In other embodiments, the user may indicate that the streaming content complete being output for presentation, then the television channel resumes being output for presentation by the television receiver. Another possible selection may be that the television channel begins being recorded by the television receiver when the remaining duration expires. The streaming content may then be completed being output for presentation, after which the television channel resumes being output from the recording. As such, the user would not need to cut short the streaming content or miss viewing a portion of the television program. In some embodiments, if an overrun occurs, either the television channel or the streaming content is output in a picture-in-picture view. In some embodiments, while the streaming content is being output for presentation, the television channel on commercial break is presented in a PiP view. In some embodiments, the streaming content is instead presented in the PiP view. Audio may correspond to either the PiP view or the streaming content, possibly based on a selection by the user or by the television service provider.

In addition to the user preferences indicated in interface 510, the remaining duration determined by the timing engine along with the playback time of the streaming content may be used to select appropriate streaming content for presentation. Streaming content may not be eligible for presentation during a commercial break unless it is expected to last an equal amount of time or less amount of time than the remaining duration of the commercial break. Therefore, a single piece of streaming content may be presented during a commercial break, or multiple, shorter pieces of streaming content may be presented during a commercial break. In some embodiments, the user may define an acceptable window of duration for the streaming content. For example, the user may indicate that, if the streaming content overruns the remaining duration by ten seconds or less, this overrun is acceptable even if a portion of the television program will be missed when it resumes from the television commercial break. Alternatively, as previously noted, the television channel may be recorded when the remaining duration of the countdown timer expires such that the user does not need to expect to miss any portion of the television program if the streaming content overruns the remaining duration.

While interface 510 illustrates user preferences, it should be understood that the television service provider may provide default values for some or all of these user preferences and/or maybe define at least some of such values without allowing a user to adjust them.

Figure 6:
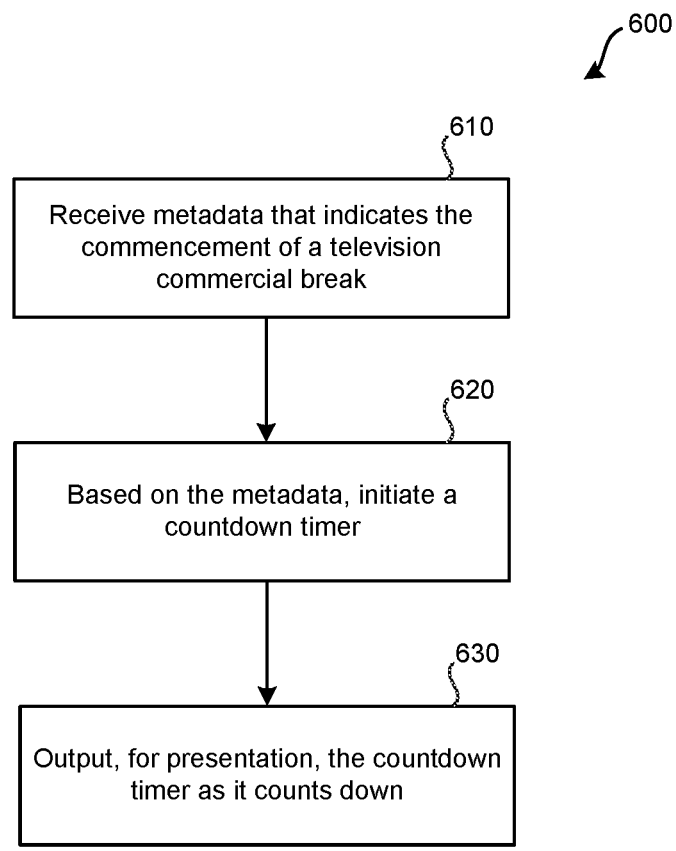
FIG. 6 illustrates an embodiment of a method for handling broadcast television commercials.

Various methods may be performed using the systems and embodiments detailed in relation to FIGS. 1-5. FIG. 6 illustrates an embodiment of a method 600 for handling broadcast television commercials. Method 600 may be performed using satellite television distribution system 100 of FIG. 1, television receiver 200 of FIG. 2, and timing engine 300 of FIG. 3. Method 600 may result in a presentation device presenting content similar to embodiment 400A of FIG. 4A or embodiments 400B of FIG. 4B. Each step of method 600 may be performed by a television receiver. The television receiver used to perform method 600 may include various computerized components, such as detailed in relation to computer system 900 of FIG. 9. Method 600 may be performed when a television viewer desires to view broadcast television programming as it is received; that is, without first recording the television programming. However, method 600 may also be used for recorded television programming in lieu of fast forwarding through the television commercial break.

At step 610, metadata may be received by a television receiver that indicates the commencement of a television commercial break. The metadata may have been created by a television service provider, such as via television service provider system 110 using metadata generation engine 111. The metadata received at step 610 may indicate the commencement of a television commercial break and/or an expected length of the commercial break. In some embodiments, such metadata is received for individual commercials rather than an entire commercial break, which is usually composed of multiple commercials presented in sequence. In a satellite-based television distribution system, the metadata received at step 610 may be included as part of the same transponder stream on which the television channel for which the commercial break is being broadcast (or is about to be broadcast). Metadata associated with a television channel may be indicated by a particular packet identifier (PID), thus allowing a PID filter to be implemented at tuning management processors 210-2 to allow the metadata to be extracted from the transponder stream, which may be made of a serial stream of packet data. In some embodiments, although the television programming is distributed via a transponder stream, the metadata may be transmitted to the television receiver via an alternate communication path, such as via the Internet or some other form of network.

At step 620, based on the received metadata, the television receiver may initiate a countdown timer. The metadata may serve to trigger the television receiver to start a countdown timer, such as via timing engine 211 of control processor 210-1 (which is detailed in relation to timing engine 300 of FIG. 3). The metadata may trigger the countdown timer to start immediately or at a defined, later time (for instance, the metadata may indicate that the countdown timer is to start 15 seconds after the metadata is received). The metadata may also serve to indicate a value from which the countdown timer should count down (e.g., one minute, thirty seconds, etc.). In some embodiments, the duration of the countdown timer is determined by the television receiver, such as based on a historical analysis of the television channel on which the television commercial break is being broadcast.

At step 630, the countdown timer is presented while the countdown timer is counting down, thus presenting a remaining duration of the countdown timer. The countdown timer may be presented via a presentation device by the television receiver outputting the remaining duration overlaid on video being output to the presentation device. Additionally or alternatively, the countdown timer may be presented directly on a display of the television receiver, such as display 256 of television receiver 200. In some embodiments, display 256 presents the countdown timer while it is active and user input can cause the countdown timer to be presented via the presentation device when desired. If the user changes the television channel while the countdown timer is active, the remaining duration may continue to be presented via the presentation device and/or the display of the television receiver. In some embodiments, when the remaining duration expires, if the user has changed the television channel to another, second television channel, the television receiver may return to the first television channel.

In such embodiments, if the two television channels are received on different transponder streams, a first tuner and second tuner may be tuned to each transponder stream simultaneously, such that the first television channel (on which the commercial break is being presented) and the second television channel such that both television channels are being received, descrambled, and decoded (e.g., from an MPEG format) simultaneously. Such an arrangement may facilitate switching between the two television channels. If the two television channels are present on the same transponder stream, the television receiver may use a single tuner to receive both television channels for descrambling and decoding.

In some embodiments, when the countdown timer expires, a determination may be made as to whether a television viewer is likely viewing the presentation device. Referring to television receiver 200, audience monitor 255 may be used to determine whether or not a television viewer is present. If not, an auditory announcement may be made by the television receiver, possibly via the presentation device, to alert a television viewer out of the room that the television programming is resuming. For example, a simulated ringing bell or spoken message may be output that indicates the commercial break is scheduled to be ending. In some embodiments, the auditory announcement may be configured to occur when the remaining duration reaches a reference value, such as twenty seconds. Such an arrangement may provide the user with time to return to viewing the presentation device, if the user so desires.

Figure 7:
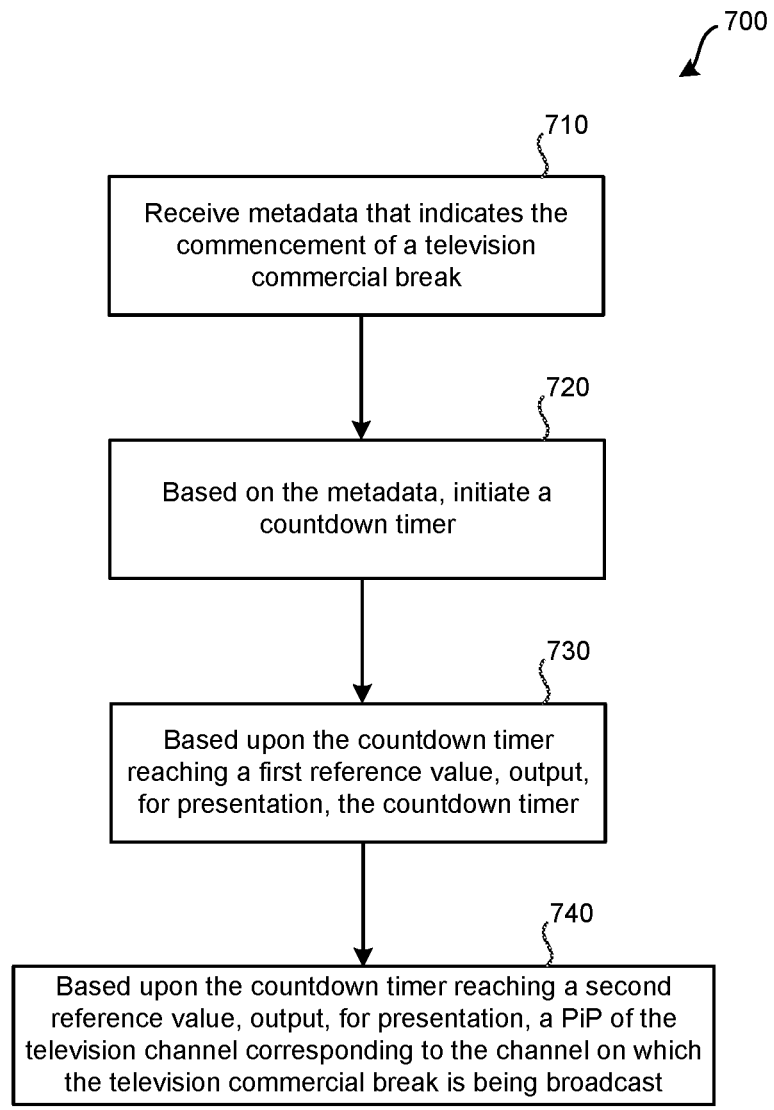
FIG. 7 illustrates an embodiment of a method for handling broadcast television commercials by altering presentation based on the remaining duration of the countdown timer.

FIG. 7 illustrates an embodiment of a method 700 for handling broadcast television commercials by altering presentation based on the remaining duration of the countdown timer. Method 700 may be performed using satellite television distribution system 100 of FIG. 1, television receiver 200 of FIG. 2, and timing engine 300 of FIG. 3. Method 700 may result in a presentation device presenting content similar to embodiment 400C of FIG. 4C.

Each step of method 700 may be performed by a television receiver. The television receiver used to perform method 700 may include various computerized components, such as detailed in relation to computer system 900 of FIG. 9. Method 700 may be performed when a television viewer desires to view broadcast television programming as it is received; that is, without first recording the television programming. However, method 700 may also be used for recorded television programming in lieu of fast forwarding through the television commercial break.

Steps 710 and 720 may be performed similarly to steps 610 and 620 of method 600, respectively. Following step 720, the countdown timer may not yet be presented. In some embodiments, a time after the countdown timer begins, the remaining duration may be removed from presentation. As such, the user may be aware the countdown timer has begun. At step 730, based upon the countdown timer reaching a first reference value, the countdown timer may begin being presented. The first reference value may be defined by the television service provider or by the user and stored as a user preference. Once the first reference value is reached by the remaining duration of the countdown timer, the countdown timer may be presented, either via the presentation device or by the display of the television receiver. Following step 730, a television viewer may be able to view the remaining duration. In some embodiments, the remaining duration is only presented if the user has also changed to another television channel while the countdown timer is active (i.e., counting down).

At step 740, the remaining duration of the countdown timer may continue to decrease as time progresses. When a second reference value is reached, a PiP view of the (first) television channel currently broadcasting the commercial break may be presented. The PiP view of the first television channel may only be presented if the user has changed the television channel to a second television channel. The second reference value may be defined by the television service provider or by the user and stored as a user preference. In some embodiments, the first reference value and the second reference value may be the same. In some embodiments, when the remaining duration expires, if the user has changed the television channel to another, second television channel, the television receiver may return to the first television channel. In other embodiments, the user may be required to provide input indicating that the user desires to tune back to the first television channel. In such embodiments, if user input to switch back to the first television channel is not received by the time the remaining duration expires, the PiP view may continue to be presented for a predefined period of time, such as one minute. If, within this time period, the user still does not provide input requesting the first channel be presented via the full screen, the PiP view may be discontinued. If the user provides user input (e.g., via a remote control) that switches presentation back to the first television channel, the second television channel may cease being presented or may be presented via the PiP view. A user preference may define how the second television channel is handled in such circumstances.

Figure 8:
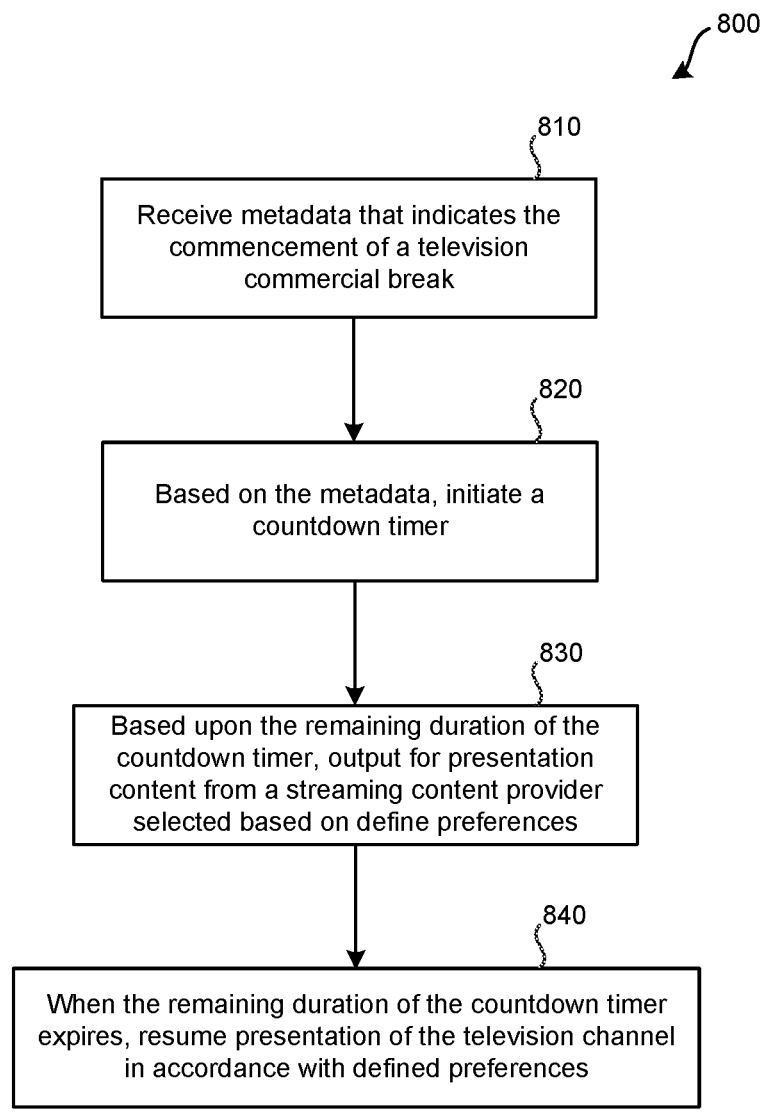
FIG. 8 illustrates an embodiment of a method for handling broadcast television commercials by presenting streaming video content during commercial breaks.

FIG. 8 illustrates an embodiment of a method 800 for handling broadcast television commercials by presenting streaming video content during commercial breaks. Method 800 may be performed using satellite television distribution system 100 of FIG. 1, television receiver 200 of FIG. 2, and timing engine 300 of FIG. 3. Each step of method 800 may be performed by a television receiver. The television receiver used to perform method 800 may include various computerized components, such as detailed in relation to computer system 900 of FIG. 9. Method 800 may be performed when a television viewer desires to view broadcast television programming as it is received; that is, without first recording the television programming. However, method 800 may also be used for recorded television programming in lieu of fast forwarding through the television commercial break.

Steps 810 and 820 may be performed similarly to steps 610 and 620 of method 600, respectively. At step 830, in addition to or in lieu of the commercial break being output for presentation, content from a third-party streaming content provider may be presented to the television viewer via the presentation device. If the television commercial break is also to be presented, it may be presented in a PiP view (or the streaming content may be presented in the PiP view). Other split-screen arrangements are also possible. In some embodiments, rather than the streaming content being retrieved from a third-party streaming content provider, such as YouTube® (that is, a streaming content provider other than the television service provider), the streaming content may be retrieved from the television service provider via a network connection. The streaming content retrieved from the streaming content provider may be selected based on user preferences and/or an indication of content to be retrieved indicated in the metadata received at step 810. In some embodiments, the streaming content is at least partially buffered before the commercial break commences such that the content will be ready for playback sooner (ideally, when the commercial break begins). The content selected for playback may at least be partially based on the remaining duration of the countdown timer. Said another way, at the beginning of the commercial break, the remaining duration is the duration of time indicated in the metadata received from the television service provider or determined by the television receiver based on a historical analysis. If the remaining duration is large enough, multiple pieces of content from one or more streaming content providers may be provided during the remaining duration. In some embodiments, the user may be permitted to select from among multiple pieces of content to select the content the user desires to view. For instance, a user may use his smartphone to create a playlist of streaming content for presentation during commercial breaks. This playlist may then be used by the television receiver (or a remote computer server) to select which piece of content should be presented during the remaining duration based on its position in the playlist and the duration of the content as compared to the remaining duration.

When the remaining duration of the countdown timer expires at step 840, the presentation of the television channel may resume. In some embodiments, a PiP view of the television channel may be presented instead, such as detailed in relation to method 700 (e.g., with user input being required to trigger presentation reverting to the television channel). The action taken by the television receiver at step 840 may be based on stored user preferences. It should be understood that aspects of method 700 may be combined with method 800 to enable a PiP view of the television channel based on the remaining duration.

Figure 9:
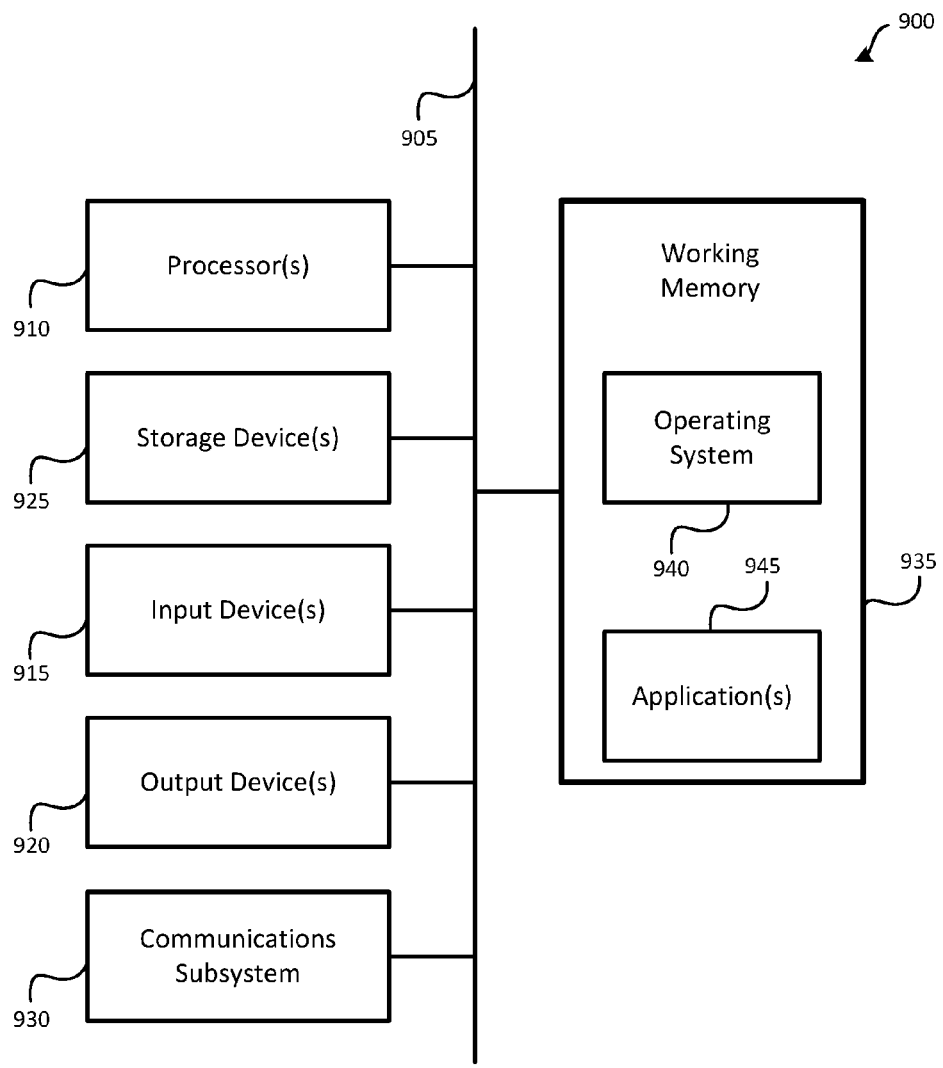
FIG. 9 illustrates an embodiment of a computer system.

FIG. 9 illustrates an embodiment of a computer system. A computer system as illustrated in FIG. 9 may be incorporated as part of the previously described computerized devices, such as the television receivers (which may be in the form of STBs), the television service provider system (or, more specifically, metadata generation engine 111, historical engine 112, and/or content selection engine 113), and/or the mobile devices. FIG. 9 provides a schematic illustration of one embodiment of a computer system 900 that can perform various steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, video decoders, and/or the like); one or more input devices 915, which can include without limitation a mouse, a keyboard, remote control, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the non-transitory storage device(s) 925. Merely by way of example, execution of the sequences of instructions contained in the working memory 935 might cause the processor(s) 910 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a non-transitory storage device 925 either before or after execution by the processor(s) 910.

It should further be understood that the components of computer system 900 can be distributed across a network. For example, some processing may be performed in one location using a first processor while other processing may be performed by another processor remote from the first processor. Other components of computer system 900 may be similarly distributed. As such, computer system 900 may be interpreted as a distributed computing system that performs processing in multiple locations. In some instances, computer system 900 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for handling broadcast television commercials, the method comprising:
    outputting, by a television receiver, an alternate content presentation selection interface that allows a user to: define a streaming content provider distinct from the television service provider, and define a selection criteria used to select streaming content from the streaming content provider;
    receiving, by the television receiver, from a television service provider, metadata that indicates: (1) a commencement of a television commercial break during a television broadcast, and (2) an expected duration of the television commercial break, wherein the metadata is broadcast by the television service provider as part of a same serial stream of packet data that comprises the television broadcast;

initiating, by the television receiver, a timer based on the received metadata indicating the commencement of the television commercial break during the television broadcast;

identifying, by the television receiver, a piece of content to request from the streaming content provider, such that the piece of content is identified based on: (1) the selection criteria defined by the user via the alternate content presentation selection interface, and (2) having a duration that is determined to be equal to or less than the expected duration indicated in the received metadata;

receiving, by the television receiver, the piece of content;

outputting, by the television receiver, for presentation to a display device, the piece of content during the television commercial break; and outputting, by the television receiver, for presentation to the display device, a picture-in-picture view of the television broadcast overlaid on the piece of content in response to the timer reaching a user-defined reference time value.

2. The method for handling broadcast television commercials of claim 1, further comprising:
receiving, by the television receiver, a user-defined time period; and
outputting, by the television receiver, the remaining duration for presentation to the display device in response to the remaining duration equaling or being less than the user-defined time period.

3. The method for handling broadcast television commercials of claim 1, further comprising:
receiving, by the television receiver, a command from a remote control requesting the remaining duration; and
outputting, by the television receiver, the remaining duration for presentation to the display device in response to the command.

4. The method for handling broadcast television commercials of claim 1, further comprising:
causing the identified piece of content to be presented by the display device instead of at least a portion of the television commercial break.

5. The method for handling broadcast television commercials of claim 1, wherein the metadata is received from a third-party provider via a network connection, the third-party provider being distinct from the television service provider.

6. The method for handling broadcast television commercials of claim 1, further comprising buffering, by the television receiver, the identified piece of content prior to outputting the identified piece of content for presentation.

7. A system for handling broadcast television commercials, the system comprising:
one or more processors; and
a non-transitory memory communicatively coupled with and readable by the one or more processors and having stored therein processor-readable instructions which, when executed by the one or more processors, cause the one or more processors to:
output, to a display device, an alternate content presentation selection interface that allows a user to:
define a streaming content provider distinct from the television service provider, and
define a selection criteria used to select streaming content from the streaming content provider;
receive metadata that indicates: (1) a commencement of a television commercial break during a television broadcast, and (2) an expected duration of the television commercial break, wherein the metadata is broadcast by the television service provider as part of a same serial stream of packet data that comprises the television broadcast;
initiate a timer based on the received metadata indicating the commencement of the television commercial break during the television broadcast;
identify a piece of content to request from the streaming content provider such that the piece of content is identified based on: (1) the selection criteria defined by the user via the alternate content presentation selection interface, and (2) having a duration that is determined to be equal to or less than the expected duration indicated in the received metadata;
receive the piece of content;
output, to the display device, the piece of content during the television commercial break; and
output for presentation to the display device, a picture-in-picture view of the television broadcast in response to the timer reaching a user-defined reference time value.

8. The system for handling broadcast television commercials of claim 7, wherein the processor-readable instructions, when executed, further cause the one or more processors to:
receive a user-defined time period; and
cause the remaining duration to be output for presentation to the display device in response to the remaining duration equaling or being less than the user-defined time period.

9. The system for handling broadcast television commercials of claim 7, wherein the processor-readable instructions, when executed, further cause the one or more processors to:
receive a command from a remote control requesting the remaining duration; and
cause the remaining duration to be output for presentation to the display device in response to the command.

10. The system for handling broadcast television commercials of claim 7, wherein the processor-readable instructions, when executed, further cause the one or more processors to: cause the identified piece of content to be presented by the display device instead of at least a portion of the television commercial break.

11. The system for handling broadcast television commercials of claim 7, wherein the metadata is received from a third-party provider via a network connection, the third-party provider being distinct from a television service provider.

12. The system for handling broadcast television commercials of claim 7, wherein the processor-readable instructions, when executed, further cause the one or more processors to:
buffering the identified piece of content prior to outputting the identified piece of content for presentation.

13. A non-transitory processor-readable medium for handling broadcast television commercials comprising processor-readable instructions configured to cause one or more processors to:
output an alternate content presentation selection interface that allows a user to: define a streaming content provider distinct from the television service provider, and define a selection criteria used to select streaming content from the streaming content provider;

receive metadata that indicates: (1) a commencement of a television commercial break during a television broadcast, and (2) an expected duration of the television commercial break, wherein the metadata is broadcast by the television service provider as part of a same serial stream of packet data that comprises the television broadcast;

initiate a timer based on the received metadata indicating the commencement of the television commercial break during the television broadcast;

identify a piece of content to request from the streaming content provider such that the piece of content is identified based on having: (1) the selection criteria defined by the user via the alternate content presentation selection interface and (2) having a duration that is determined to be equal to or less than the expected duration indicated in the received metadata;

receive the piece of content;

output to a display device, the piece of content during the television commercial break; and output for presentation to the display device, a picture-in-picture view of the television broadcast overlaid on the piece of content in response to the timer reaching a user-defined reference time value.

14. The non-transitory processor-readable medium of claim 13, wherein the processor-readable instructions are further configured to cause the one or more processors to cause the identified piece of content to be buffered prior to the commercial break.

* * * * *